US010122900B2

(12) United States Patent
Liu et al.

(10) Patent No.: US 10,122,900 B2
(45) Date of Patent: Nov. 6, 2018

(54) CAMERA MOUNTING DEVICE

(71) Applicant: Logitech Europe S.A., Lausanne (CH)

(72) Inventors: Ivan Liu, Zhunan Township (TW); Ivan Ho, Lausanne (CH); Jr-Jay Jhang, Zhubei (TW); Gary Choi, Hsinchu (TW); Chun-Wei Su, Taipei (TW); Luke Wu, New Taipei (TW)

(73) Assignee: Logitech Europe S.A., Lausanne (CH)

( * ) Notice: Subject to any disclaimer, the term of this patent is extended or adjusted under 35 U.S.C. 154(b) by 15 days.

(21) Appl. No.: 15/287,619

(22) Filed: Oct. 6, 2016

(65) Prior Publication Data

US 2018/0103183 A1 Apr. 12, 2018

(51) Int. Cl.
*H04N 5/225* (2006.01)
*G03B 17/56* (2006.01)

(52) U.S. Cl.
CPC ......... *H04N 5/2253* (2013.01); *G03B 17/561* (2013.01); *H04N 5/2252* (2013.01)

(58) Field of Classification Search
CPC ... H04N 5/2253; H04N 5/2252; G03B 17/561
USPC ........................................................ 348/373
See application file for complete search history.

(56) References Cited

U.S. PATENT DOCUMENTS

| 6,081,422 A * | 6/2000 | Ganthier | G06F 1/1605 348/14.01 |
| 6,239,841 B1 * | 5/2001 | Verstockt | G06F 1/1607 348/373 |
| 6,462,781 B1 * | 10/2002 | Arnold | H04N 5/2251 348/373 |
| 6,587,151 B1 * | 7/2003 | Cipolla | G06F 1/1607 348/373 |
| 2008/0036876 A1 * | 2/2008 | Kaneda | H04N 5/23293 348/230.1 |
| 2008/0088696 A1 * | 4/2008 | Giraldo | H04N 7/144 348/14.08 |

FOREIGN PATENT DOCUMENTS

WO 2009/154576 A1 12/2009

* cited by examiner

*Primary Examiner* — Nhan T Tran
(74) *Attorney, Agent, or Firm* — Kilpatrick Townsend & Stockton LLP (57) ABSTRACT

A web cam device includes a camera housing, a camera disposed in the camera housing, a data cable coupled to the camera that extends from the camera housing, and a base including an aperture to receive the data cable such that the base is slideable along the data cable, where the aperture provides a sliding friction to the data cable, and where the camera is operable to be mounted on a monitor when the camera is positioned on a front of the monitor, the data cable is configured to pass through the aperture of the base, and the base is secured against the back of the monitor and held by the sliding friction of the aperture on the data cable. The camera housing can include a protrusion extending from the camera housing and is flush against the front of the monitor when the camera is mounted on the display device.

10 Claims, 9 Drawing Sheets

CAMERA MOUNTING DEVICE

BACKGROUND

Web cameras are typically hardware cameras that are connected to a computer and allow a user that is connected to the Internet to view still pictures or motion video of a person or object. Web cameras (or "web cams") are routinely used in business and personal calls in applications like Skype®, Google Talk®, Jitsi®, ooVoo®, or the like, and are widely available as a stand-alone accessory or, in some cases, they can be integrated in a computing device (e.g., laptop computer, smart phone, etc.).

Stand-alone web cams are typically designed for specific uses. For instances, some web cams are designed to be attached to a monitor. Other web cams may be designed to stand on a work surface. Some may have adjustable features, while others have fixed features (e.g., lenses). While web cam developments have come a long way, more adaptable and universally configurable designs are needed.

BRIEF SUMMARY

Certain embodiments of the invention relate to a web cam that can be adapted to mount on any type of display device (e.g., computer monitor) or work surface (e.g., computer desk). In some embodiments, an apparatus includes a camera housing, a camera disposed in the camera housing, a data cable coupled to the camera and extending from the camera housing, and a base including an aperture, where the aperture is operable to receive the data cable such that the base is slideable along the data cable. The aperture can provide a sliding friction to the data cable. The camera can be operable to be mounted on a display device when the camera is positioned on a front of the display device, the data cable is configured to pass through the aperture of the base, and the base is secured against the back of the display device when the base is held by the sliding friction of the aperture on the data cable.

In some embodiments, the camera housing can include a bottom portion and a protrusion extending from the bottom portion of the camera housing, where the protrusion includes a flat surface that is flush against the front of the display device when the camera is mounted on the display device. The base can further include a bottom surface to rest on a work surface, and a slot to receive the protrusion of the camera housing, where the camera housing can be configured in an upright position when the protrusion is positioned in the slot and the bottom surface of the base is on the work surface. The camera can be configured at an angle with respect to the camera housing, where the angle can be adjustable. In some cases, the aperture can be a notched portion on the base, or a hole in the base. The cable can be any suitable data cable, including a Universal Serial Bus (USB) cable.

In further embodiments, a method includes positioning a camera housing on a front portion of a display device, positioning a base on a back portion of the display device, guiding a data cable (e.g., USB cable) through an aperture of the base, and securing the base against the back portion of the display device by performing at least one of sliding the base along the data cable toward the back of the display device, or cinching the base against the back of the display device using the data cable. The camera may be disposed in the camera housing and the data cable can be coupled to the camera and extend from the camera housing.

In some embodiments, the aperture can be operable to receive the data cable such that the base is slideable along the data cable. The camera housing can include a bottom portion and a protrusion extending from the bottom portion of the camera housing, where the protrusion includes a flat surface, and the flat surface of the protrusion can be flush against the front of the display device when the camera housing is mounted on the display device. The base can further include a top surface and a bottom surface, where the top surface includes a slot disposed therein, and where the method can further include coupling the camera housing to the base by placing the bottom surface of the base on a work surface, and sliding the protrusion into the slot. In some cases, the camera can be configured at an angle with respect to the camera housing, where the angle can be adjustable. In some implementations, the aperture can be a notched portion on the base, a hole in the base, or the like.

In certain embodiments, a camera system can include a camera housing, a camera disposed in the camera housing, a first contact surface on the camera housing, a data cable coupled to the camera and extending from the camera housing, and a base having a second contact surface and an opposing side opposite the second contact surface, where the base includes an aperture passing between the second contact surface and the opposing side, where the aperture is operable to receive the data cable such that the base support is slideable along the data cable, where the aperture provides a sliding friction to the data cable, and where the data cable can pass through the display device region. In some cases, the first contact surface and the second contact surface can define a display device region operable to receive a display device. The base support can provide a counterweight to the camera housing. The data cable can pass over a top of the display device and be taut as it passes between a first plane parallel to the first contact surface and a second plane parallel to the second contact surface. The camera can be configured at an angle with respect to the camera housing. In some cases, the angle can be adjustable.

In some embodiments, a camera system includes a camera housing having a bottom portion and a back portion, where the camera housing includes a protrusion having a flat surface that extends from the back portion, a camera disposed in the camera housing, and a data cable coupled to the back portion of the camera and extending from the camera housing. The camera system can further have a base that includes an aperture operable to receive the data cable such that the base is slideable along the data cable, and a slot operable to receive the protrusion and secure the camera housing in an upright configuration. The aperture can provide a sliding friction to the data cable. Alternatively or additionally, a different device (e.g., clasp, pin, or other hardware, etc.) can be used to secure the camera and base to the display device (instead of the sliding friction). In some implementations, the camera system can be mountable on a display device when the camera is positioned such that the flat surface of the protrusion is flush against a front portion of the display device, the data cable is configured to pass through the aperture of the base, and the base is secured against a back of the display device and held by the sliding friction of the aperture to the data cable. The camera system can be mountable on a work surface when the base is positioned on the work surface, and the protrusion of the camera housing is inserted in the slot, holding the camera housing in the upright configuration.

BRIEF DESCRIPTION OF THE DRAWINGS

The detailed description is set forth with reference to the accompanying figures.

DETAILED DESCRIPTION

Aspects of the invention relate generally to camera mounting systems for web-based cameras that operate in conjunction with computing devices including desktop computers, laptop computers, tablet computers, netbooks, and the like.

In the following description, various embodiments of a camera mounting system will be described. For purposes of explanation, specific configurations and details are set forth in order to provide a thorough understanding of the embodiments. However, it will be apparent to one skilled in the art that certain embodiments may be practiced without every disclosed detail. Furthermore, well-known features may be omitted or simplified in order not to obscure the embodiments described herein.

Figure 4:
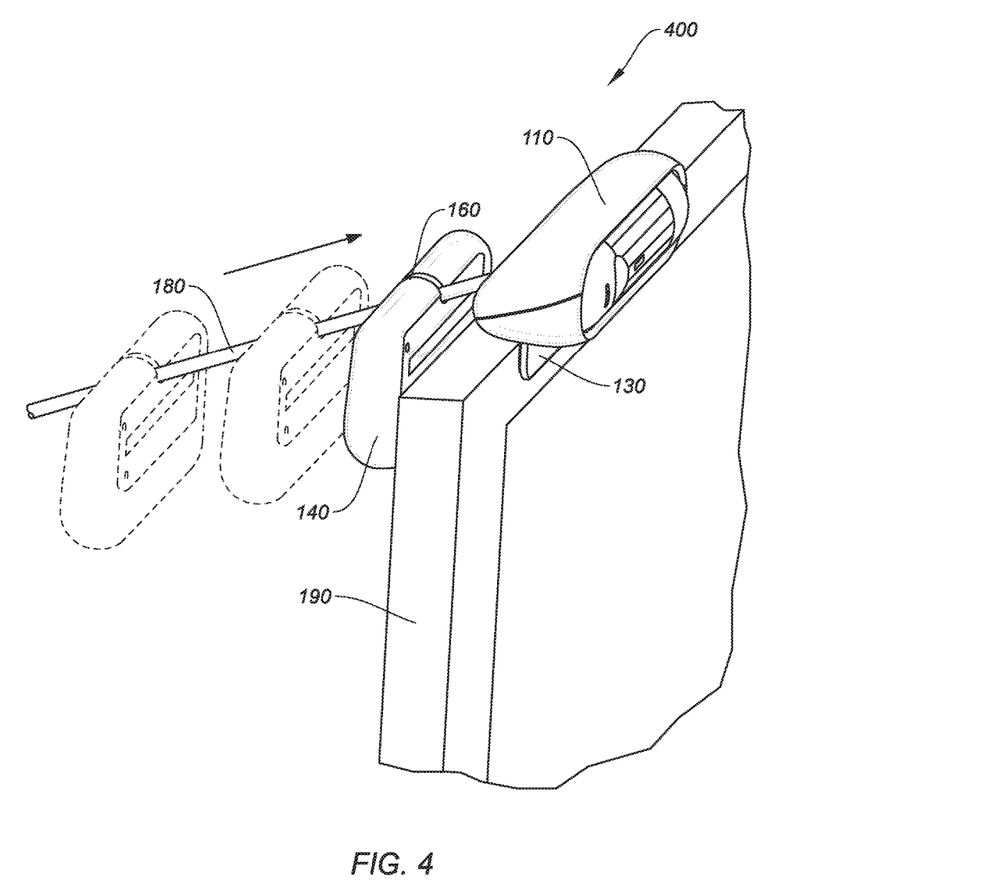
FIG. 4 shows how a camera mounting device is mounted on a display device, according to certain embodiments.
Figure 5A:
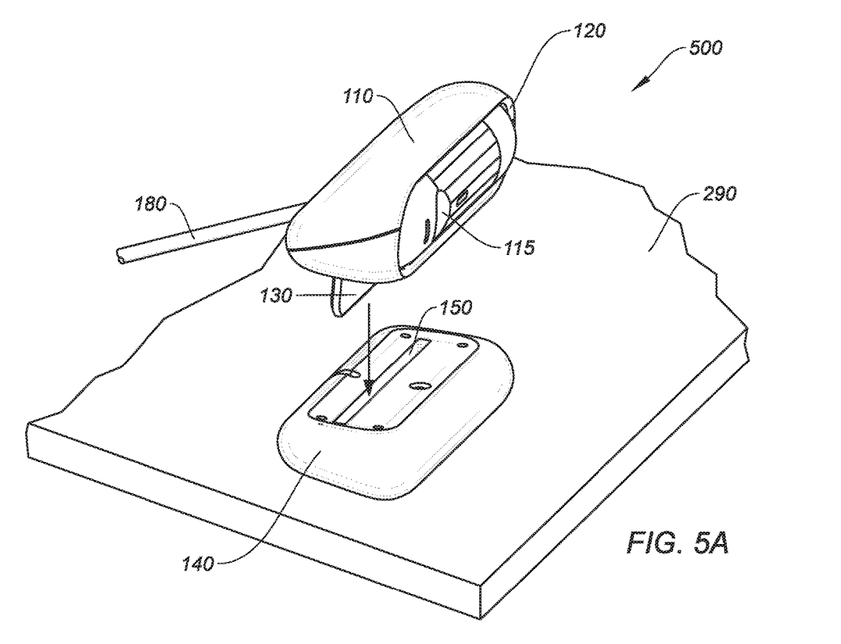
FIG. 5A shows how a camera mounting device can be mounted on a work surface, according to certain embodiments.
Figure 5B:
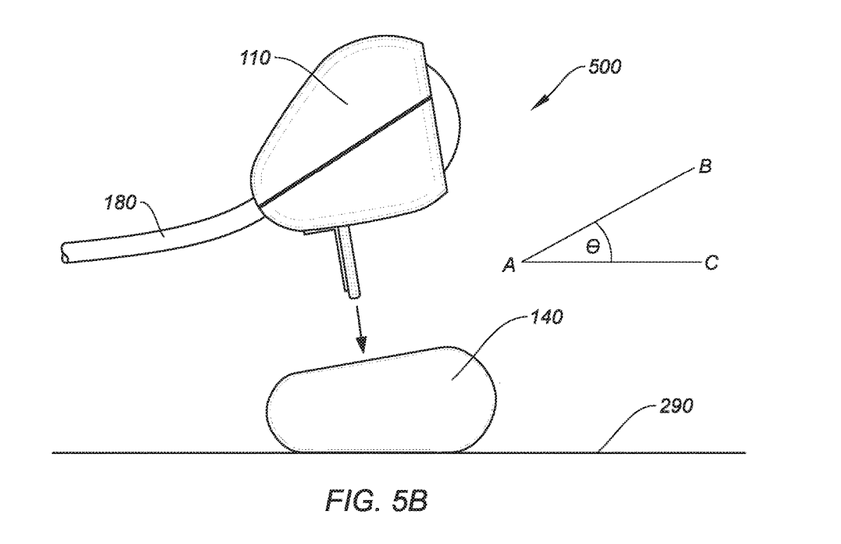
FIG. 5B shows a side-view of how a camera mounting device can be mounted on a work surface, according to certain embodiments.

Certain embodiments of the invention relate to a web cam that can be adapted to mount on any type of display device or work surface. In certain embodiments, a camera mounting system includes a camera (e.g., web cam) in a camera housing, a data cable coupled to the camera and extending from the camera housing, and a base including an aperture. The data cable can be fed into the aperture such that the base is slideable along the data cable and provides a sliding friction. The camera system can be mounted on a display device (e.g., the bezel) when the camera housing is positioned on a front of the display device. The data cable can be configured to pass through the aperture of the base. The base can be secured against the back of the display device when the base and camera housing are cinched together around the display device and held in place by the sliding friction of the aperture on the data cable, as shown in FIG. 4. In some embodiments, the camera mounting system can also be mounted on a work surface. The camera housing can include a bottom portion with an extending protrusion that can be inserted in a slot disposed in the base, as shown in FIGS. 5A-5B.

Figure 1A:
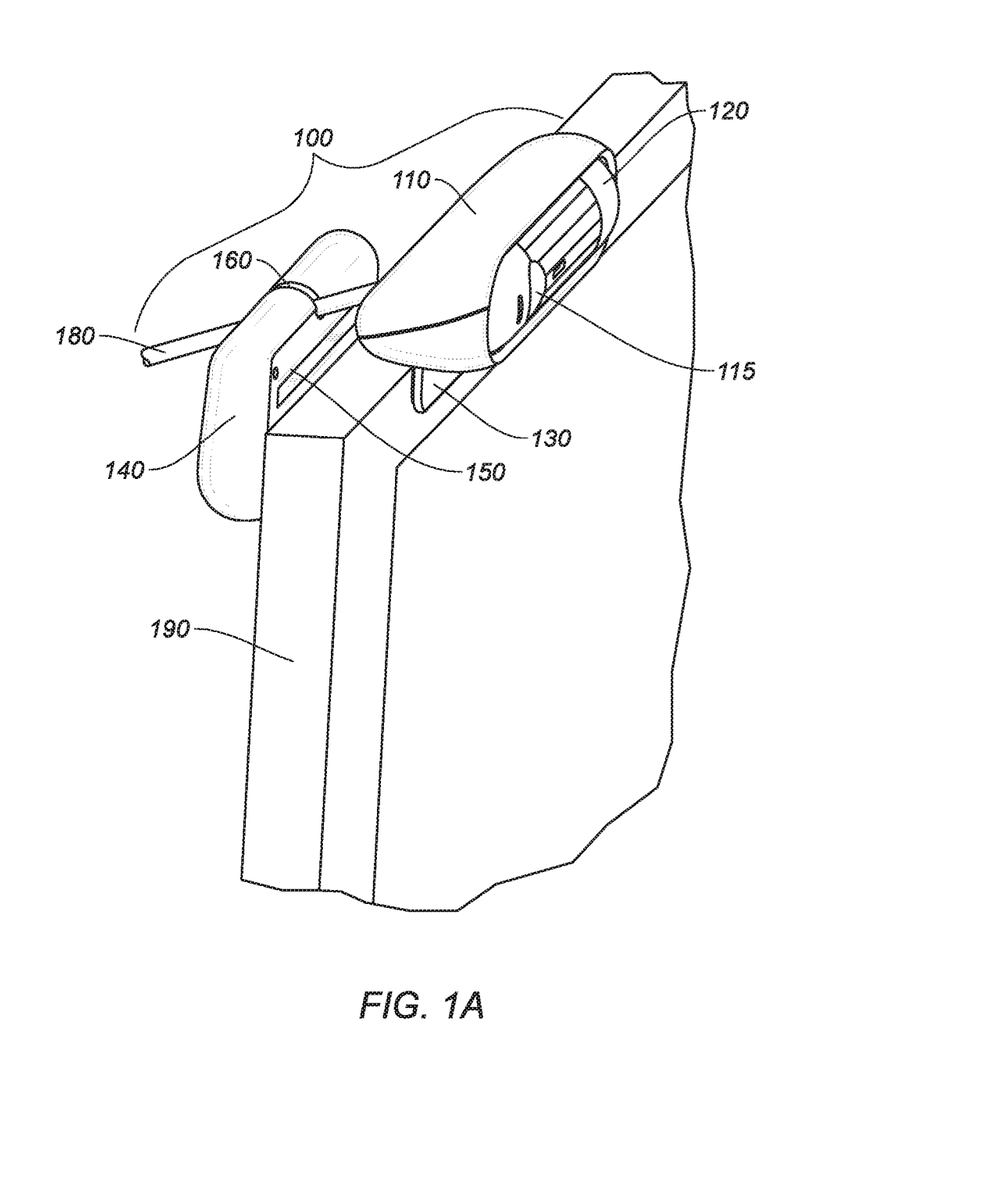
FIG. 1A shows a camera mounting device mounted on display device, according to certain embodiments.

FIG. 1A shows camera mounting device 100 mounted on display device ("display") 190, according to certain embodiments. Camera mounting device 100 can include camera housing 110 ("housing 110") and base 140. Housing 110 can include camera 115, adjustable camera support ("rotatable support") 120, and protrusion 130. Camera 115 can be disposed in adjustable support 120. Camera 115 can further include a data cable coupled to the housing (and the supporting electronics therein).

Housing 110 can be of any suitable shape and size. Referring to FIG. 1A, housing 110 is shown having an oval-shaped and rounded front surface and a skewed tear drop shaped side profile. Housing 110 can house one or more printed circuit boards (PCBs) and/or supporting electronics for camera 115. For example, housing 110 may house some or all aspects of system 800 of FIG. 8. Housing 110 may be comprised of any suitable material including thermoplastic elastomers (TPE), PVC, thermoplastic polyurethane (TPU), silicone-based compounds, rubber-based compounds (e.g., vulcanized rubber), metal (e.g., aluminum), polycarbonates, or other suitable material, as would be known by one of ordinary skill in the art.

Rotatable support 120 can include camera 115 disposed therein. Rotatable support 120 can be configured in housing 110 such that it can rotate inside and relative to housing 110 to provide multiple viewing angles for camera 115. Referring to FIG. 1, rotatable support 120 can be rotated upwards or downwards with approximately 70 degrees of rotation. Some embodiments may include larger (e.g., 90 degrees) or smaller ranges of rotation. In some cases, rotatable support 120 may have two axes of rotation such that camera 115 can be moved left-to-right, up-and-down, and any combination thereof. Rotatable support 120 can be comprised of any suitable material, as mentioned above with respect to housing 110.

Camera 115 can be of any suitable image sensor technology including, but not limited to, complementary metal-oxide-semiconductor (CMOS)-based and charge-coupled device (CCD) cameras. In some embodiments, multiple cameras can be used and each may be individually adjusted (e.g., via rotatable support 120). Alternatively or additionally, camera 115 can be focused and directed (e.g., aimed) via software (e.g., via aspects of system 800 or variants thereof) that controls optical characteristics of camera 115. Camera 115 (and any other corresponding electronics) can be electrically coupled to data cable 180, as further discussed below.

Protrusion 130 can have dual functions: (1) to be placed flush against a front of a display device (e.g., monitor) when the camera mounting device 100 is installed on the display device (e.g., as shown in FIGS. 1 and 4) to provide a brace and counter support to base 140 (as further discussed below); and (2) to be inserted into slot 150 of base 140 when camera mounting device 100 is placed on a work surface to support housing 110 (and camera 115) in an upright position (e.g., as shown in FIGS. 5A-5B). Protrusion 130 can be coupled to housing 110, as shown in FIG. 1. In some embodiments, protrusion 130 may extend from the bottom of housing 110. Protrusion 130 can be rectangularly shaped with a flat surface, however any shape or dimensions can be used, and protrusion 130 can be coupled to housing 110 in any suitable location.

In certain embodiments, protrusion 130 may be removable. For example, a user may swap one protrusion with another (e.g., each having different dimensions) to change an angle of housing 110 relative to the display device and/or work surface. Protrusion 130 can be comprised of any suitable material (e.g., plastics, rubbers, metals—as discussed above with respect to housing 110). In some cases, protrusion 130 may be retractable (e.g., by spring loading). For instance, protrusion 130 may retract into housing 110 such that the bottom of protrusion 130 is flush with the bottom of housing 110. In some implementations, multiple protrusions can be coupled to housing 110.

Alternative components can be used instead of or in addition to protrusion 130. For instance, other means of coupling can be used to attach housing 110 to display device 190 and/or base 140, as noted above. For example, magnets, hardware (e.g., fasteners, screws, tabs, pins, etc.), Velcro®, or the like, may be used. One of ordinary skill in the art would understand the many variations, modifications, and alternative embodiments thereof.

Base 140 can include slot 150 and aperture 160. Base 140 can be comprised of any suitable material including thermoplastic elastomer TPE, PVC, TPU, silicone-based compounds, rubber-based compounds, metal (e.g., aluminum), polycarbonates, or other suitable material, as would be known by one of ordinary skill in the art. Referring to FIG. 1A, base 140 has a rectangular shape that is skewed to provide an angled top surface that can pitch housing 110 upward when housing 110 is placed on a work surface, as shown in FIG. 5B. In some cases, base 140 may have a different angle or no angle (e.g., the top and bottom surfaces are parallel).

Slot 150 can be disposed on the top side of base 140 and may receive protrusion 130 to support housing 110 in an upright configuration (see, e.g., FIG. 1B), according to certain embodiments. Slot 150 may span any suitable length along base 140 and should be designed to accommodate protrusion 130. That is, slot 150 can be any suitable length equal to or longer than protrusion 130. In some cases, multiple slots can be used. For instance, a first slot may be disposed in housing 110 at a first angle (e.g., 70 degrees), and a second slot may be disposed at a second angle different than the first (e.g., 80 degrees). Slot 150 or additional slots may be disposed on any location of housing 110. For example, a first slot can be disposed on a top side of housing 110 and a second slot can be disposed on a bottom side of housing, where the slots (and/or base 140) may have different associated angles to pitch housing 110 at different angles.

Aperture 160 can be disposed on base 140, according to certain embodiments. Aperture 160 can receive data cable 180 (e.g., in the manner shown in FIG. 1A) to provide a sliding friction. Aperture 160 can be a notch (see, e.g., FIG. 3A), a hole (see, e.g., FIG. 3B), or other type of opening that can provide similar functionality as described herein. Aperture 160 can be disposed at any suitable location on base 140. One of ordinary skill in the art would understand the many variations, modifications, and alternative embodiments thereof.

Data cable 180 can be in electronic communication with camera 115 and any corresponding electronics (e.g., any aspect of system 800). Data cable 180 also serves to couple camera mounting device 100 to display device 190. For example, when camera 115 is positioned on the front of display device 190, data cable 180 can be configured to pass through aperture 160 of base 140, which provides a friction as base 140 moves along data cable 180. This sliding friction can be used to secure base 140 to the back of display device 190, as further discussed below with respect to FIG. 7.

Display device 190 can be a monitor, television, or other suitable display device, as would be known by one of ordinary skill in the art. Camera mounting device 100 is designed to couple to a variety of different types of display devices and can accommodate any shape, size, or dimension (e.g., typically the bezel of display device 190) due to the adaptable nature of camera mounting device 100 (see, e.g., FIG. 4).

Figure 1B:
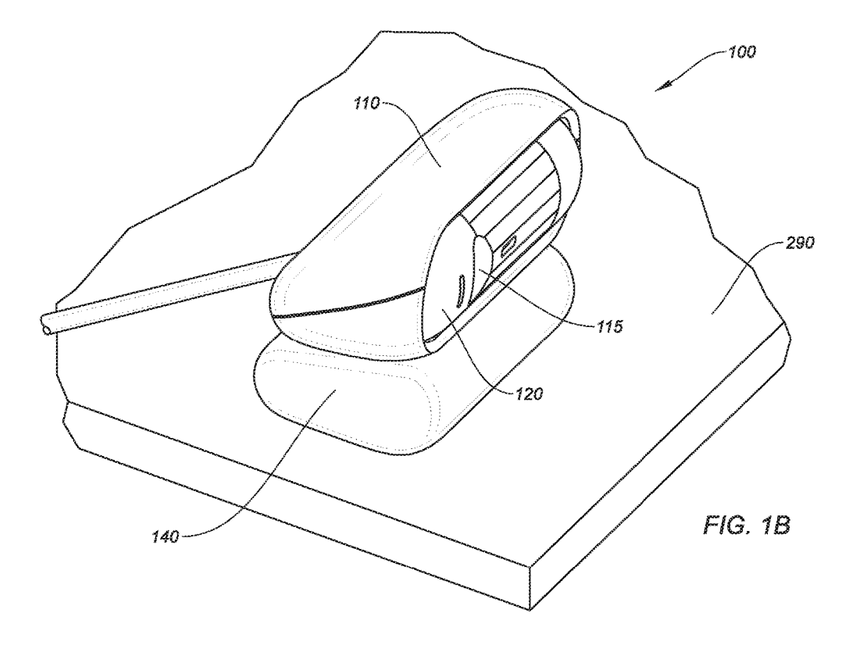
FIG. 1B shows a camera mounting device mounted on a work surface, according to certain embodiments.

FIG. 1B shows camera mounting device 100 mounted on work surface 290, according to certain embodiments. Protrusion 130 (not shown) can be inserted in slot 150 (not shown) such that housing 110 is mounted on base 140, as shown. In this configuration, a user may want to place camera mounting device 100 on a work surface rather than a display device if, for example, the display device is too far away (e.g., a wall-mounted television). As discussed above, rotatable support 120 can be used to angle camera 115 in any desired direction. Work surface 290 can be any suitable surface including a desk, chair, table, object (e.g., book), or other suitable location with or without a planar surface.

Figure 2A:
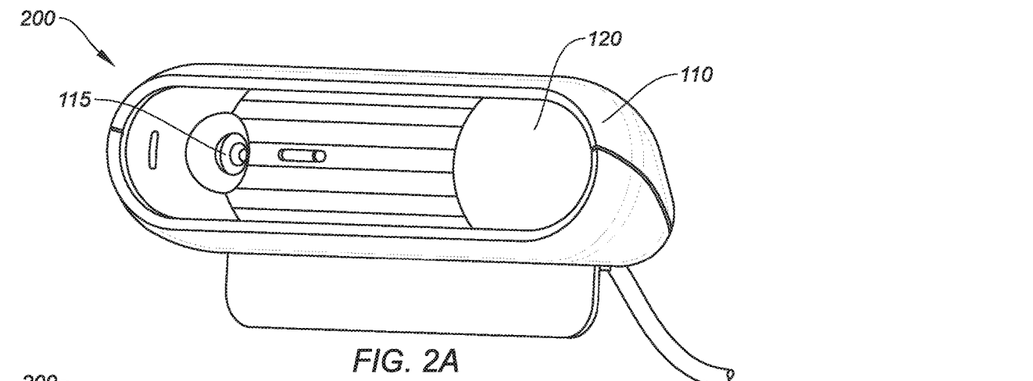
FIG. 2A shows a housing with a camera configured to be focused straight ahead, according to certain embodiments.
Figure 2B:
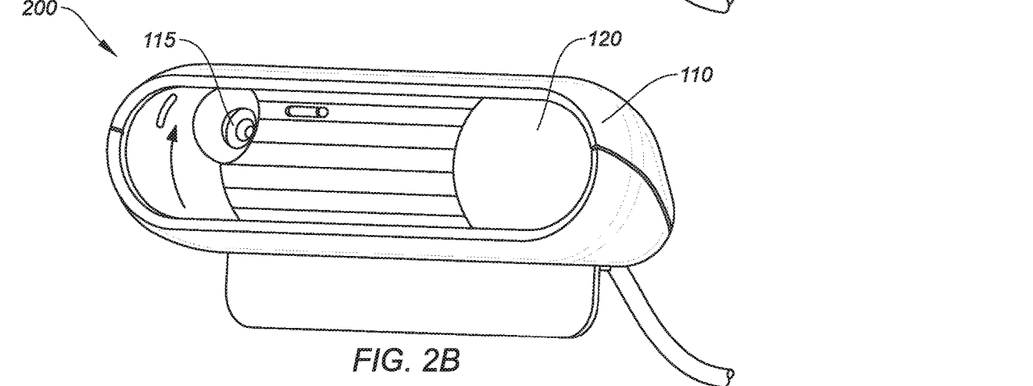
FIG. 2B shows a rotatable support pitched upwards such that a camera in a corresponding housing is angled in an upwards direction, according to certain embodiments.
Figure 2C:
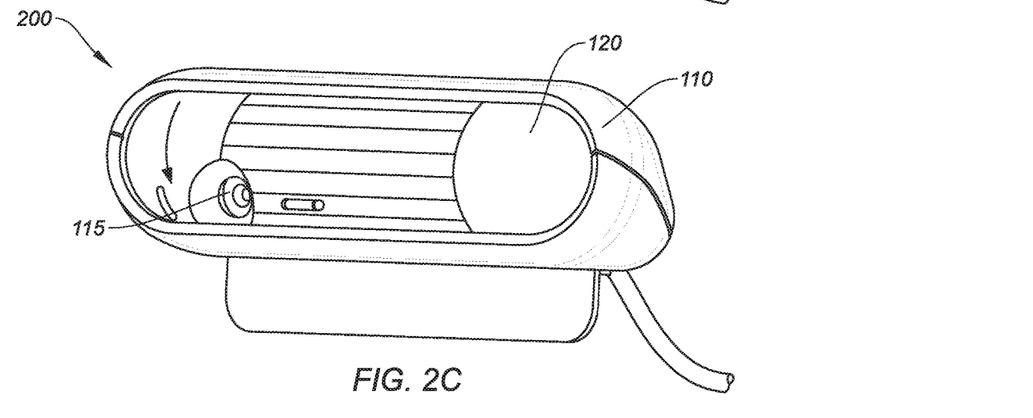
FIG. 2C shows a rotatable support pitched downwards such that a camera in a corresponding housing is angled in a downwards direction, according to certain embodiments.

FIG. 2A shows housing 110 with camera 115 configured to be focused straight ahead, according to certain embodiments. FIG. 2B shows rotatable support 120 pitched upwards such that camera 115 is angled in an upwards direction. FIG. 2C shows rotatable support 120 pitched downwards such that camera 115 is angled in a downward direction. In some embodiments, rotatable support 120 can move the direction that camera 115 is pointed in a first axis (e.g., up/down) and/or a second axis (e.g., left/right). In some embodiments, the direction of focus for camera 115 may be software controlled (e.g., by aspects of system 800), as would be understood by one of ordinary skill in the art.

Figure 3A:
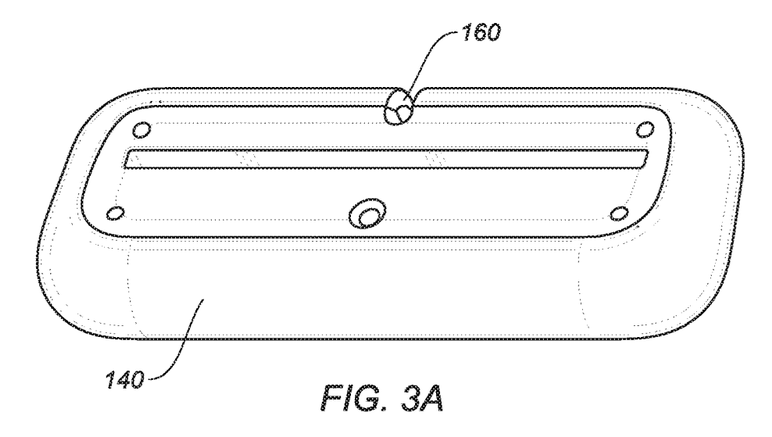
FIG. 3A shows a base and corresponding aperture, according to certain embodiments.

FIG. 3A shows base 140 and corresponding aperture 160, according to certain embodiments. Aperture 160 is shown as a notch disposed on a center portion of an edge of base 140, however aperture 160 can be disposed in any location on base 140—preferably at a location that can receive a data cable (i.e., data cable 180 can be fed through it) and does not interfere with the functional configurations of camera mounting device 100 (e.g., as shown in FIGS. 1A-1B). Aperture 160 can receive data cable 180 (e.g., in the manner shown in FIG. 1A) to provide a sliding friction as base 140 is moved along the length of data cable 180. In some embodiments, the sliding friction can be approximately 1 kgf, although the sliding frictions can be used, as would be understood by one of ordinary skill in the art.

Aperture 160 may be of any size (e.g., gauge) provided that it provides enough sliding friction to data cable 180. In some cases, aperture 160 may have multiple aperture sizes. For instance, a first portion of aperture 160 may be wider (e.g., 20% wider) than data cable 180 so that the corresponding slideable resistance is minimal, and a second portion of aperture 160 may be smaller in diameter to provide the slideable friction as described above. Thus, a user can use the first portion (not shown) to freely move base 140 with respect to housing 110, and the second portion (e.g., by moving data cable 180 from the first portion to the second portion) to then provide the sliding friction to hold base 140 in place on display device 190, as described herein. In some cases, the difference between the first and second portions can be a ratio (e.g., 1.25:1, 1.5:1, 2:1, etc.). One of ordinary skill in the art would understand the many variations, modifications, and alternative embodiments thereof.

Figure 3B:
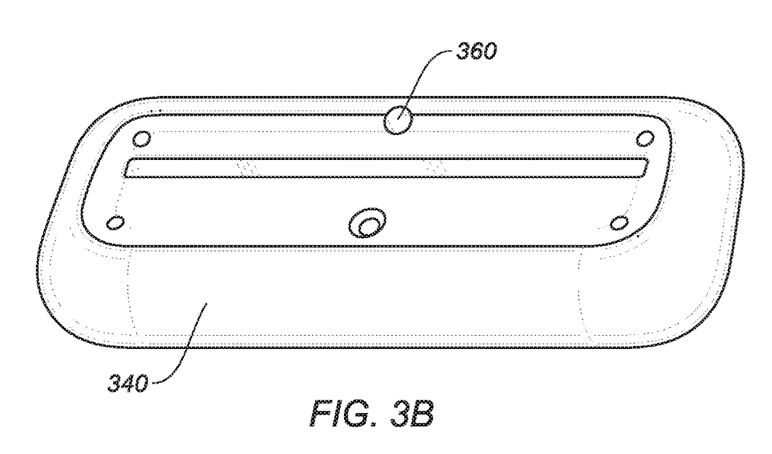
FIG. 3B shows a base and corresponding alternative aperture, according to certain embodiments.

FIG. 3B shows base 340 and corresponding alternative aperture 360, according to certain embodiments. Specifically, aperture 360 is a hole, rather than a notch, as shown in FIG. 3A. Aperture 360 may provide certain advantages. For instance, in some cases, data cable 180 can be permanently fed through aperture 360, which may keep housing 110 and base 340 together and prevent inadvertent misplacement of one or the other.

In some embodiments, an aperture may not be disposed directly in the base. For example, hardware (e.g., screw or bolt with eyelet) can be bolted or fastened to the base in any suitable manner to receive data cable 180 in a similar manner as aperture 160. That is, some embodiments may include features that perform the function of aperture 160, but are not necessarily integrated with or built-in to the base.

FIG. 4 shows how camera mounting device 400 is mounted on display device 190, according to certain embodiments. The flat surface of protrusion 130 of housing 110 can be placed against the front portion (e.g., bezel) of display device 190, as shown. Data cable 180 can be placed in aperture 160, which provides a sliding friction, and base 140 is cinched up (e.g., slid along data cable 180) against a back side of display device 190, as shown. In some cases, the sliding friction and gravity (e.g., counteracting downward forces provided by housing 110 and base 140) hold camera mounting device 400 in place.

In FIG. 4, display device 190 is shown to have a flat back portion, however base 140 can be adapted to fit any type of display device including those with wider bezels, narrower bezels, non-planar bezels (e.g., rounded back portions), and the like, by simply sliding base 140 along data cable 180 to accommodate the mounting point on display device 190.

Although the embodiments shown and described herein depict a display device as a mounting location for camera mounting device 400, it would be understood by one of ordinary skill in the art that camera mounting device 400 can be mounted on other objects besides display device 190, provided that there is a suitable surface to brace protrusion 130 and base 140 in the manner described above. For example, camera mounting device 400 can be mounted on a platform, bookcase, chair back, etc. One of ordinary skill in the art would understand the many variations, modifications, and alternative embodiments thereof.

FIG. 5A shows how camera mounting device 500 can be mounted on work surface 290, according to certain embodiments. Protrusion 130 of housing 110 can be positioned over and placed (e.g., slid) inside slot 150 of base 140. Slot 150 can provide a sliding friction such that protrusion 130 (and by extension housing 110) is secured in base 140. Base 140 can be of a sufficient weight (e.g., 10 grams) and/or dimensions (e.g., wide base and large surface area) to provide a stable base to prevent camera mounting device 500 from tipping over. Protrusion 130 and slot 150 are typically positioned such that data cable 180 can freely extend from the back of housing 110 without being obstructed or stressed (e.g., kinked, subject to sharp bends, etc.).

FIG. 5B shows a side-view of how camera mounting device 500 can be mounted on work surface 290, according to certain embodiments. Base 140 is shown having a pitched top surface such that housing 110 is pitched upward at an angle Θ. Work surfaces are typically set lower than eye level, so the upward pitch can help aim camera 115 toward the face of a user. In some embodiments, base 140 may have a different pitched angle, or no angle (e.g., bottom surface of base 140 being parallel to its top surface). Alternatively or additionally, rotatable support 120 can also be used to aim camera 115 accordingly.

In some embodiments, base 140 may have multiple slots that may be located on any portion of base 140, including the top side and/or bottom side. Base 140 may be include fixed or adjustable feet to further provide control over the resulting camera angle (with respect to work surface 290). In some cases, slot 150 may be adjustable to change the width, depth, or length, as would be appreciated by one of ordinary skill in the art.

Figure 6A:
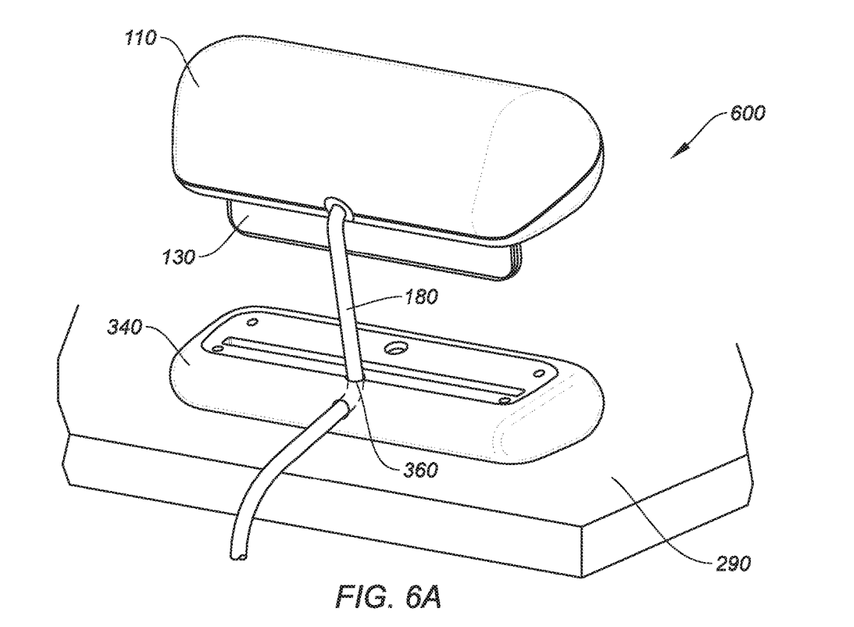
FIG. 6A shows how a data cable can work in conjunction with an aperture of a camera housing to mount to a base, according to certain embodiments.
Figure 6B:
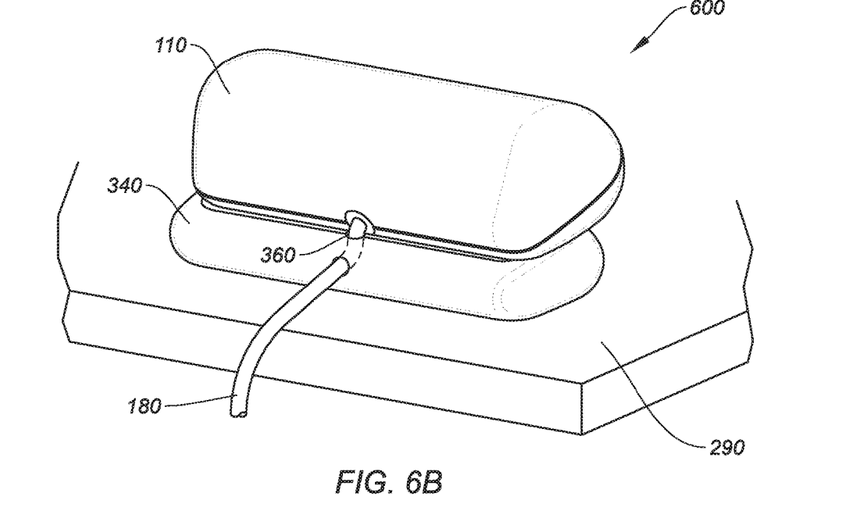
FIG. 6B shows how a data cable can work in conjunction with an aperture of a camera housing to mount to a base, according to certain embodiments.

FIGS. 6A-6B shows how data cable 180 can work in conjunction with aperture 360 of housing 110 to mount to base 340, according to certain embodiments. As discussed above with respect to FIG. 3B, aperture 360 is a hole instead of a notch (e.g., see FIG. 3A). In this embodiment, data cable 180 can be configured to remain in aperture 360 such that housing 110 and base 340 maintain a connection (via data cable 180) regardless of the configuration of camera mounting device 600 (e.g., display mounted or work surface mounted). One advantage of aperture 360 can include keeping the components (e.g., housing 110 and base 340) together to prevent loss or misplacement. In some implementations, aperture 160 (e.g., a notch, hole, or other type of opening) can be coated with a material (e.g., Teflon®) to change the sliding friction that it provides. One of ordinary skill in the art would understand the many variations, modifications, and alternative embodiments thereof.

Figure 7:
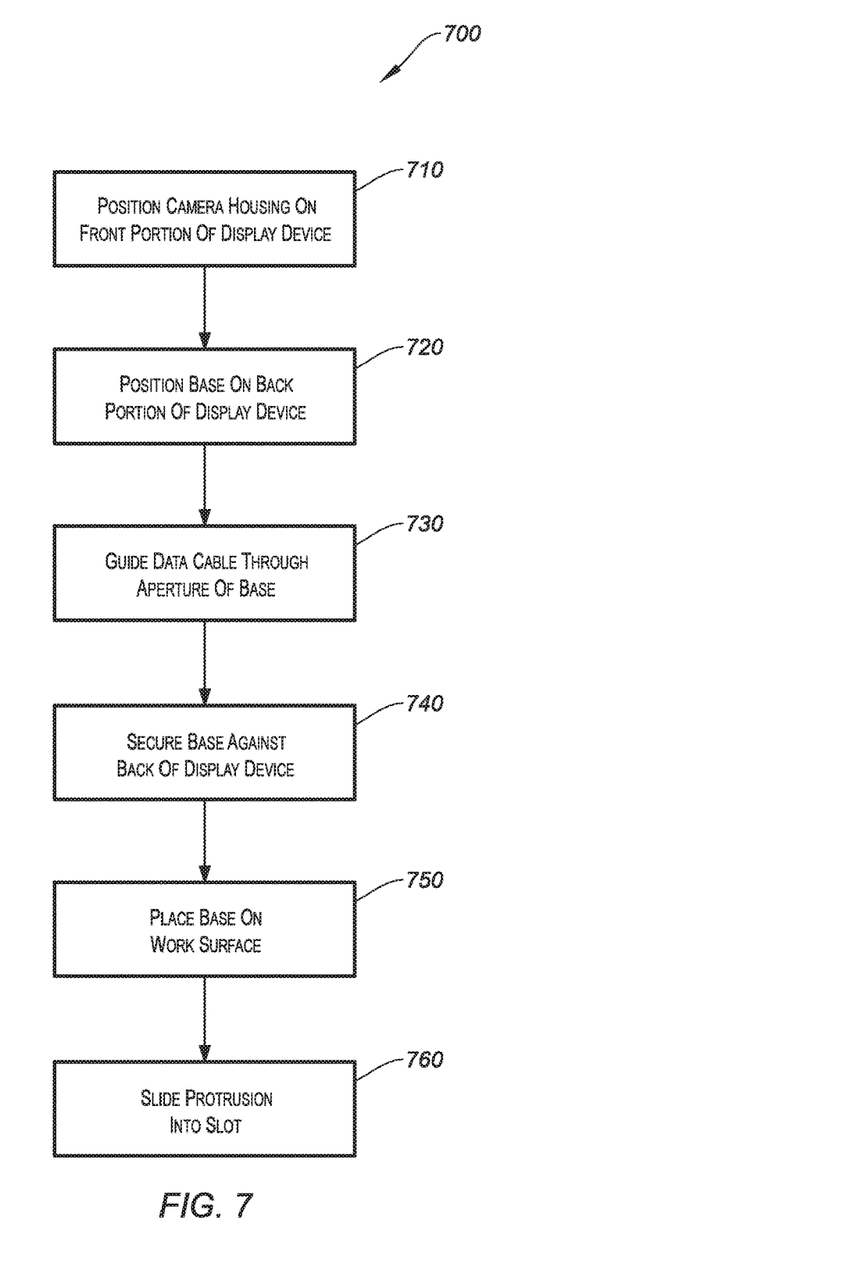
FIG. 7 shows a simplified flow chart illustrating a method for configuring a camera mounting device on a display device and/or work surface, according to certain embodiments.

FIG. 7 shows a simplified flow chart illustrating a method 700 for configuring camera mounting device 100 on a display device and/or work surface, according to certain embodiments. At step 710, method 700 can include positioning housing 110 on a front portion of display device 190, according to certain embodiments. Camera 115 can be disposed in housing 110 and data cable 180 can be coupled to camera 115 and extend therefrom. In some cases, housing 110 can include a bottom portion and protrusion 130 extending therefrom. Protrusion 130 may include a flat surface that can be positioned such that it is flush against the front of display device 190 when housing 110 is mounted on the display device.

At step 720, method 700 can include positioning base 140 on a back portion of display device 190, according to certain embodiments. Base 140 can include aperture 160 (see, e.g., FIGS. 6A-6B). In some embodiments, aperture 160 is operable to receive data cable 180 such that base 140 is slideable along data cable, where aperture 160 can provide a sliding friction to data cable 180.

At step 730, method 700 can include guiding data cable 180 through aperture 160 of base 140, according to certain embodiments.

At step 740, method 700 can include securing base 140 against the back of display device, according to certain embodiments. In some cases, securing base 140 against display device 190 can be achieved by sliding base 140 along data cable 180 toward the back of display device 190 and cinching base 140 against the back of display device 190 using data cable 180.

In some embodiments, base 140 further includes a top surface and a bottom surface, where the top surface can include slot 150 disposed therein. In such embodiments, method 700 can include coupling housing 110 to base 140 by placing the bottom surface of base 140 on work surface 290 (step 750), and sliding protrusion 130 into slot 150 (step 760). In some cases, camera 115 can be configured at an angle with respect to the camera housing, which can be due to an adjustable camera (e.g., camera angle adjustable via rotatable support 120) or due to contours of base 140 (e.g., slope of top surface of base 140, as shown in FIG. 5B). In some embodiments, aperture 160 can be a notched portion of base 140, a hole in base 140, or other type of opening. Data cable 180 can be a USB cable, FireWire® cable, HDMI cable, DVI cable, Audio/Video component cable, or other suitable data cable, as would be appreciated by one of ordinary skill in the art.

It should be appreciated that the specific steps illustrated in FIG. 7 provide a particular method 700 for configuring camera mounting device 100 on a display device and/or work surface, according to certain embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 700.

Figure 8:
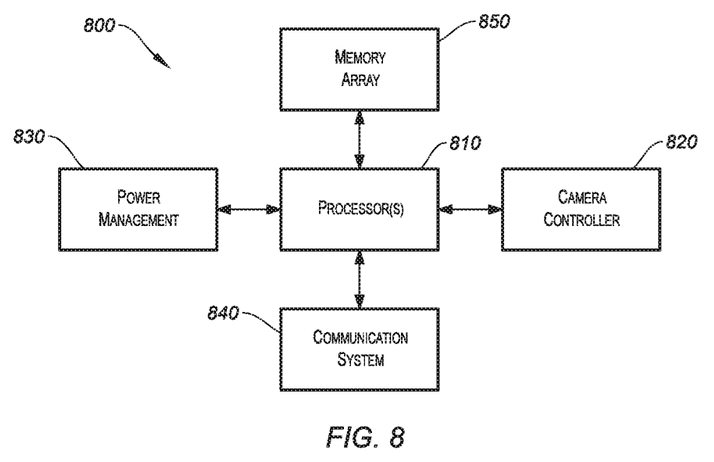
FIG. 8 is a simplified block diagram of system configured to operate a camera mounting device, according to certain embodiments.

FIG. 8 is a simplified block diagram of system 800 configured to operate camera mounting device 100, according to certain embodiments. System 800 can include processor(s) 810, camera controller 820, power management system 830, communication system 840, and memory array 850. Each of system blocks 820-850 can be in electrical communication with processor(s) 810. System 800 may include more or fewer systems, as would be appreciated by one of ordinary skill in the art, and are not shown or discussed to prevent obfuscation of the novel features described herein. System blocks 820-850 may be implemented as separate modules, or alternatively, two or more system blocks may be combined in a single module. For instance, some or all of system blocks 820-850 may be subsumed by processor(s) 810. System 800 and variants thereof can be used to operate the camera mounting devices described and depicted (FIGS. 1-7) throughout this disclosure. System 800 can be contained in housing 110 in whole or in part, as would be understood by one of ordinary skill in the art.

In certain embodiments, processor(s) 810 may include one or more microprocessors (μCs) and may control the operation of system 800. Alternatively, processor(s) 810 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, processor(s) 810 may be configured to control aspects of charging controls, media controls, and the like.

Camera controller 820 may be configured to control aspects of camera 115 for any of the embodiments shown and described at least in FIGS. 1-7, according to certain embodiments. In some embodiments, camera controller 820 may control lens operations of camera 115 including focus control, zoom control, movement control (e.g., individual movement of the lens), or the like. In some implementations, camera controller 820 can receive sensor data (sensor not shown) indicating when protrusion 130 is placed in slot 150 to determine when a user is likely using camera mounting device 100 on display device 190 (first mode of operation) or work surface 290 (second mode of operation). The sensor can be any suitable sensor to detect the presence of protrusion 130 in slot 150, such as switch. When protrusion 130 is or is not detected, rotatable support 120 can be automatically adjusted to accommodate which the detected mode of operation. For instance, when display device is determined to be mounted on a display device, rotatable support 120 can control camera 115 to pitch downwards (e.g., 20 degrees) to capture an area likely to be a user's face. Likewise, when display device is determined to be mounted on a work surface (e.g., protrusion 130 is placed in slot 150), rotatable support 120 can control camera 115 to pitch upwards (e.g., 40 degrees) to capture the user's face. Camera 115 can then be adjusted further by the user, if necessary, for additional adjustments.

In other embodiments, camera controller 820 can control the image quality generated by camera mounting device 100. For example, the image quality of still images or video can be reduced (e.g., low-definition) when low-bandwidth conditions exist, and increased (e.g., high-definition) when high-bandwidth conditions exist. One of ordinary skill in the art would understand the many variations, modifications, and alternative embodiments thereof.

Memory array 850 can store information such as camera control parameters, communication parameters, or the like. Memory array 850 may store one or more software programs to be executed by processors (e.g., processor(s) 810). It should be understood that "software" can refer to sequences of instructions that, when executed by processor(s), cause system 800 to perform certain operations of software programs. The instructions can be stored as firmware residing in read-only memory (ROM) and/or applications stored in media storage that can be read into memory for processing by processing devices (processor(s) 810). Software can be implemented as a single program or a collection of separate programs and can be stored in non-volatile storage and copied in whole or in-part to volatile working memory during program execution. Memory array 850 can include random access memory (RAM), read-only memory (ROM), long term storage (e.g., hard drive, optical drive, etc.), and the like, as would be understood by one of ordinary skill in the art.

Power management system 830 can be configured to manage power distribution between systems (blocks 810-850), mode operations, power efficiency, and the like, for the various camera mounting devices described herein. In some embodiments, power management system 830 can include one or more energy storage devices (e.g., batteries—not shown), a recharging system for the battery (e.g., using data cable 180), power management devices (e.g., low-dropout voltage regulators—not shown), or the like. In certain embodiments, the functions provided by power management system 830 may be incorporated into processor(s) 810. An energy storage device can be any suitable rechargeable energy storage device including, but not limited to, NiMH, NiCd, lead-acid, lithium-ion, lithium-ion polymer, and the like. Energy storage devices may charge a camera mounting device via a cable (e.g., data cable 180, dedicated power supply cable, etc.), or inductive power coupling. The recharging system can include an additional cable (specific for the recharging purpose) or it can use a socket in housing 110 (e.g., coupled to a computer, power adapter, etc.) to recharge the energy storage device.

Communication system 840 can be configured to provide wired (e.g., via data cable 180) and/or wireless communication between camera mounting device 100 and one or more external computing devices or peripheral devices. Some non-limiting examples of communication between camera mounting device and an external computing device can include camera control operations, communicating status updates including memory capacity and usage, operational properties (e.g., camera specifications, mode of operation, etc.) and the like. Communications system 840 can be configured to provide radio-frequency (RF), Bluetooth, infra-red, ZigBee, or other suitable communication protocol to communicate with other computing devices. In some embodiments, data cable 180 can be a USB cable, FireWire cable, or other cable to enable bi-directional electronic communication between camera mounting device 100 and an external computing device. Some embodiments may utilize different types of cables or connection protocol standards to establish hardwired or wireless communication with other entities.

Although certain necessary systems may not expressly discussed, they should be considered as part of system 800, as would be understood by one of ordinary skill in the art. For example, system 800 may include a bus system to transfer power and/or data to and from the different systems therein.

It should be appreciated that system 800 is illustrative and that variations and modifications are possible. System 800 can have other capabilities not specifically described herein. Further, while system 800 is described with reference to particular blocks (810-850), it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks may or may not be reconfigurable depending on how the initial configuration is obtained.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising:
   a camera housing including a protrusion extending from a surface of the camera housing;
   a camera disposed in the camera housing;
   a data cable coupled to the camera and extending from the camera housing; and
   a base including:
     a notch or an aperture, each operable to receive the data cable such that the base is slideable along the data cable and provide a sliding friction to the data cable;
     a slot disposed on a surface of the base and operable to receive the protrusion of the camera housing, such that when the protrusion is positioned in the slot, the camera housing is held in an upright position that is substantially normal to the surface of the base, and
   wherein the camera is operable to be mounted on a display device when:
     the camera is positioned on a front of the display device;
     the data cable is configured to pass through the aperture or notch of the base; and
     the base is secured against the back of the display device.

2. The apparatus of claim 1 wherein the camera housing includes a bottom portion and the protrusion extends from the bottom portion of the camera housing,
   wherein the protrusion includes a flat surface, and
   wherein the flat surface of the protrusion is flush against the front of the display device when the camera is mounted on the display device.

3. The apparatus of claim 2 wherein the base further includes:
   a bottom surface configured to rest on a work surface when the protrusion is positioned in the slot.

4. The apparatus of claim 1 wherein the camera is configured at an angle with respect to the camera housing, and wherein the angle is adjustable.

5. The apparatus of claim 1 wherein the aperture is a hole in the base.

6. The apparatus of claim 1 wherein the data cable is a USB cable.

7. A method comprising:
   positioning a camera housing on a front portion of a display device,
     wherein a camera is disposed in the camera housing,
     wherein a data cable is coupled to the camera and extends from the camera housing;
   positioning a base on a back portion of the display device,
     wherein the base includes a notch,
     wherein the notch is operable to couple to and decouple from the data cable, and
     wherein the notch is operable to couple to the data cable such that the base is slideable along the data cable; and
   guiding the data cable through the notch of the base; and
   securing the base against the back portion of the display device by:
     sliding the base along the data cable toward the back of the display device; and
     cinching the base against the back of the display device using the data cable.

8. The method of claim 7 wherein the camera housing includes a bottom portion and a protrusion extending from the bottom portion of the camera housing,
   wherein the protrusion includes a flat surface, and
   wherein the flat surface of the protrusion is flush against the front of the display device when the camera housing is mounted on the display device.

9. The method of claim 8 wherein the base further includes a top surface and a bottom surface,
   wherein the top surface includes a slot disposed therein, and wherein the method further includes coupling the camera housing to the base by:
placing the bottom surface of the base on a work surface; and
sliding the protrusion into the slot.

10. The method of claim 7 wherein the camera is configured at an angle with respect to the camera housing, and wherein the angle is adjustable.

\* \* \* \* \*